(12) United States Patent
Hassan et al.

(10) Patent No.: US 10,051,545 B2
(45) Date of Patent: Aug. 14, 2018

(54) CALL HANDLING BETWEEN A CELLULAR NETWORK AND A COMMUNICATION SERVICE

(71) Applicant: Microsoft Technology Licensing, LLC, Redmond, WA (US)

(72) Inventors: Amer Aref Hassan, Kirkland, WA (US); Danny Levin, Tel Aviv (IL); Bradford R. Clark, Broomfield, CO (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/044,416

(22) Filed: Feb. 16, 2016

(65) Prior Publication Data

US 2017/0238231 A1 Aug. 17, 2017

(51) Int. Cl.
*H04W 40/02* (2009.01)
*H04W 36/00* (2009.01)
(Continued)

(52) U.S. Cl.
CPC ............. *H04W 40/02* (2013.01); *H04M 3/54* (2013.01); *H04M 7/0057* (2013.01); *H04W 4/16* (2013.01);
(Continued)

(58) Field of Classification Search
CPC ..... H04L 45/00; H04L 67/303; H04L 67/306; H04L 67/327; H04L 5/0012; H04L 5/0073; H04L 63/10; H04L 51/26; H04L 12/1813; H04L 47/20; H04L 47/2408; H04L 63/04; H04L 67/1097; H04L 67/22; H04M 15/63; H04M 2203/651; H04M 15/66; H04M 15/8228; H04Q 2213/13389; H04W 36/0011; H04W 4/008; H04W 84/12; H04W 88/06; H04W 12/06; H04W 88/02; H04W 8/18; H04W 28/0247; H04W 4/26; H04W 72/02
See application file for complete search history.

(56) References Cited

U.S. PATENT DOCUMENTS 6,154,445 A 11/2000 Farris et al.
6,574,470 B1 6/2003 Chow et al.
(Continued)

OTHER PUBLICATIONS

Serafin, Zig., "Announcing preview of new Skype for Business services in Office 365", Published on: Jul. 1, 2015 Available at: https://blogs.office.com/2015/07/01/announcing-preview-of-new-skype-for-business-services-in-office-365/.
(Continued)

*Primary Examiner* — Nizar Sivji

(57) ABSTRACT

Techniques for call handling between a cellular network and a communication service are described. In at least some embodiments, a call refers to a real-time exchange of communication media between different communication endpoints. According to one or more embodiments, techniques described herein determine whether to route a call over a cellular network or to transfer (e.g., hand over) the call from the cellular network to a communication service. This determination can be made based on various policies that consider different call-related criteria.

30 Claims, 10 Drawing Sheets

(51) Int. Cl.
  *H04W 40/36* (2009.01)
  *H04M 3/54* (2006.01)
  *H04M 7/00* (2006.01)
  *H04W 4/16* (2009.01)
  *H04W 76/12* (2018.01)

(52) U.S. Cl.
  CPC ....... *H04W 36/0022* (2013.01); *H04W 40/36* (2013.01); *H04W 76/12* (2018.02); *H04M 2207/185* (2013.01)

(56) References Cited

U.S. PATENT DOCUMENTS

| | | | |
|---|---|---|---|
| 6,751,210 | B1 | 6/2004 | Shaffer et al. |
| 7,391,761 | B1 | 6/2008 | Ruckart et al. |
| 8,477,926 | B2 | 7/2013 | Jasper et al. |
| 8,547,967 | B2 | 10/2013 | Grabelsky et al. |
| 8,755,373 | B1 | 6/2014 | Cowick |
| 8,817,777 | B2 * | 8/2014 | Manian ................. H04L 12/589 370/352 |
| 2004/0114515 | A1 * | 6/2004 | Kim ................. H04L 12/6418 370/230 |
| 2011/0065427 | A1 | 3/2011 | Landgren et al. |
| 2013/0142065 | A1 | 6/2013 | Bartlett et al. |
| 2013/0242775 | A1 | 9/2013 | Taylor |
| 2013/0272295 | A1 | 10/2013 | von Wachter Mahler |

OTHER PUBLICATIONS

"Plan and deploy Cloud PBX with on-premises PSTN Connectivity in Skype for Business Server 2015", Retrieved on: Sep. 28, 2015 Available at: https://technet.microsoft.com/en-us/library/mt455212.aspx.

Percy, Alan., "Office 365 E5: Microsoft Highlights Cloud PBX, More", Published on: Jul. 20, 2015 Available at: http://www.nojitter.com/post/240170294/office-365-e5-microsoft-highlights-cloud-pbx-more.

"MaxCS Private Cloud", Published on: Feb. 16, 2015 Available at: http://maxcs.com/solutions/maxcs-private-cloud/.

"Cloud PBX", Published on: Jun. 8, 2013 Available at: http://jive.com/cloud-pbx/.

"What is PSTN calling?", Retrieved on: Sep. 28, 2015 Available at: https://support.office.com/en-us/article/What-is-PSTN-calling-3dc773b9-95e0-4448-b2f1-887c54022429?ui=en-US&rs=en-US&ad=US.

"International Search Report and Written Opinion", Application No. PCT/US2017/017074, dated May 9, 2017, 13 pages.

* cited by examiner

CALL HANDLING BETWEEN A CELLULAR NETWORK AND A COMMUNICATION SERVICE

BACKGROUND

Modern communication systems enable users to communicate in a variety of ways and according to a variety of different modalities. For instance, users can exchange various types of media such as voice, video, content, collaborative media, and so forth. However, the ability of different independent communication systems to cooperate in handling a particular communication session is typically limited.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for call handling between a cellular network and a communication service are described. In at least some embodiments, a call refers to a real-time exchange of communication media between different communication endpoints. According to one or more embodiments, techniques described herein determine whether to route a call over a cellular network or to transfer (e.g., hand over) the call from the cellular network to a communication service. This determination can be made based on various policies that consider different call-related criteria.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
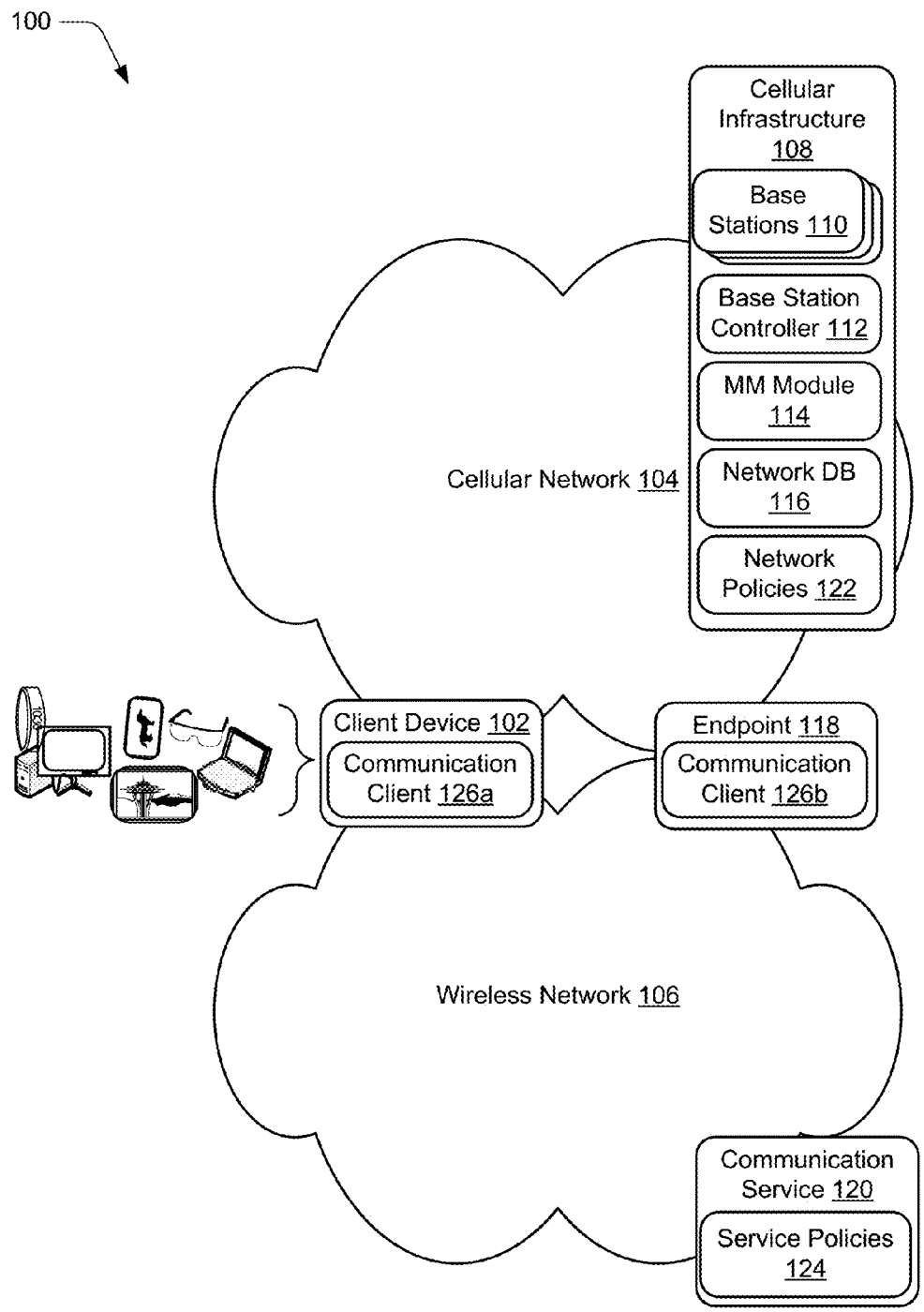
FIG. 1 is an illustration of an environment in an example implementation that is operable to employ techniques discussed herein.

Techniques for call handling between a cellular network and a communication service are described. In at least some embodiments, a call refers to a real-time exchange of communication media between different communication endpoints. For instance, a call refers to an exchange of audio communication data over a cellular voice connection and/or a data connection that is distinct from a cellular voice connection. Examples of an audio call include a Voice over Internet Protocol (VoIP) call, a standard wired telephone call, a mobile phone call initiated over a wireless cellular network, and/or combinations thereof.

According to one or more implementations, techniques described herein determine whether to route a call over a cellular network or to transfer (e.g., hand over) the call from the cellular network to a communication service. This determination can be made based on policies applied by an infrastructure component of the cellular network and/or at the communication service. The policies may be based on various criteria, such as availability of alternative networks, signal quality across available networks, agreements between different entities deploying different networks, and so forth.

For instance, consider a scenario where a user initiates a call from a client device (e.g., a cellular handset) on a cellular network. An infrastructure component of the cellular network determines that the client device is associated with a user who subscribes to a communication service. Based on this determination, the cellular network routes the call to the communication service. For instance, the cellular network notifies the communication service of the call, and passes control of the call the communication service.

Further to this scenario, the communication service determines how to route the call. For instance, the call can be routed via a private cloud implemented by the communication service, or returned to the cellular network to reach a destination device. According to various implementations, the communication service determines how to route the call based on a variety of policies. For example, the policies can specify different routines and handling behaviors based on characteristics of devices involved in a call, characteristics of networks to which each device is connected, whether are particular device is associated with a user who subscribes to the communication service, and so forth.

Accordingly, techniques described herein enable call handling based on a variety of criteria to optimize call quality and security across different networks.

In the following discussion, an example environment is first described that is operable to employ techniques described herein. Next, a section entitled "Example Implementation Scenarios" describes some example implementation scenarios in accordance with one or more embodiments. Following this, a section entitled "Example Procedures" describes some example procedures in accordance with one or more embodiments. Finally, a section entitled "Example System and Device" describes an example system and device that are operable to employ techniques discussed herein in accordance with one or more embodiments.

Example Environment

FIG. 1 is an illustration of an environment 100 in an example implementation that is operable to employ techniques for call handling between a cellular network and a communication service are described herein. Generally, the environment 100 includes various devices, services, and networks that enable communication via a variety of different modalities. For instance, the environment 100 includes a client device 102 connected to a cellular network 104 and optionally one or more wireless networks 106. The client device 102 may be configured in a variety of ways, such as a traditional computer (e.g., a desktop personal computer, laptop computer, and so on), a mobile station, an entertainment appliance, a smartphone, a wearable device, a netbook, a game console, a handheld device (e.g., a tablet), and so forth.

The cellular network 104 is representative of a network that provides the client device 102 with wireless connectivity to various networks and/or services, such as for voice communication, data communication, and so forth. The cellular network 104 may be provided and/or managed by a particular enterprise entity, such as a cellular service provider. The cellular network 104 may provide the client device 102 with connectivity via a variety of different wireless cellular technologies, such as 3G, 4G (e.g., Long Term Evolution (LTE)), 5G, and so forth.

According to various implementations, the cellular network 104 is implemented via a cellular infrastructure 108, which is representative of functionality to deploy and manage infrastructure components and logic of the cellular network 104. Generally, components of the cellular infrastructure 108 can be, and typically are, distributed across a wide geographic area. For instance, the cellular infrastructure 108 includes base stations 110, a base station controller 112, a mobile management ("MM") module 114, and a network database (DB) 116. The base stations 110 are representative of functionality for receiving cellular signal transmission from and transmitting cellular signal to client devices, such as the client device 102 and an endpoint 118. The base stations 110 are distributed over a wide geographic area (e.g., globally) to provide cellular connectivity across diverse geographic locations. According to various implementations, the endpoint 118 is representative of different devices with which the client device 102 may communicate, such as other client devices.

The base station controller 112 is representative of functionality to manage various operational aspects of the base stations 110. The base station controller 112, for instance, manages base station operations for different individual base stations 110 that are distributed over different geographical areas. In at least some implementations, individual base stations 110 may include respective instances of the base station controller 112 that are each responsible for different operational aspects of their individual base stations 110.

The network DB 116 is representative of functionality to track various information pertaining to management of cellular resources for the cellular network 104. The network DB 116, for instance, tracks identities of devices and/or users that have accounts with a communication service 120. For example, the network DB 116 indicates whether the client device 102 and/or the endpoint 118 have accounts with the communication service 120.

The MM module 114 is representative of functionality to execute logic to make different handling decisions for handling communication sessions that involve the cellular network 104. For instance, the MM module 114 applies network policies 122 to particular communication sessions to ascertain how the communication sessions are to be handled. Generally, the network policies 122 specify different handling procedures for communication sessions that meet different criteria. In at least some implementations, applying a particular network policy 122 determines whether a call is to remain with the cellular network 104 or if the call is to be handled by the communication service 120. The MM module 114, for example, can cause the call to be handed over to the communication service 120 and/or send a notification identifying the call to the communication service 120 without handing over the call. In at least some implementations, when the client device 102 initiates a call, the MM module 114 checks a number associated with the client device 102 and determines if the client device 102 is associated with (e.g., has an account with) the communication service 120. Based on whether the client device 102 is associated with the communication service 120, the MM module 114 facilitates routing of the call over either the cellular network 104 or handing over the call for handling by the communication service 120.

The MM module 114 may reside in any portion of the cellular infrastructure 108 such as a standalone module, as part of the base station controller 112, within one or more of the base stations 110, and so forth. In at least some implementations, the MM module 114 represents a feature set that is enforced, but not owned, by the cellular network 104. For instance, the MM module 114 may be deployed and/or managed by the communication service 120.

In addition to call management, the MM module 114 may perform various other services such as interfacing with other cellular networks, performing number management, number porting, and so on.

Generally, the communication service 120 is representative of a service to perform various tasks for management of communication between the client device 102 and the endpoint 118. The communication service 120, for instance, can manage initiation, moderation, and termination of communication sessions. According to various implementations, the communication service 120 maintains a presence across many different networks and can be implemented according to a variety of different architectures, such as a cloud-based service, a distributed service, a web-based service, and so forth. Examples of the communication service 120 include a VoIP service, an online conferencing service, a Unified Communication and Collaboration (UC&C) service, and so forth. In at least some embodiments, the communication service 120 may be implemented as or be connected to a private branch exchange (PBX) in communication with a Public Switched Telephone Network ("PSTN") to enable voice communication between the client device 102 and other client devices.

As referenced above, a call initiated by the client device 102 over the cellular network 104 may be handed over to the communication service 120 in response to the MM module 114 determining that a user of the client device 102 has an account with the communication service 120. Accordingly, after handover of the call from the cellular network 104 to the communication service 120, the communication service 120 applies communication service ("service") policies 124 to the call to determine if the call is to be handled by the communication service 120 or if call handling is to be returned to the cellular network 104. Generally, the service policies 124 specify various actions that are to be applied to calls that meet different criteria. For instance, the service policies 124 specify different call handling procedures based on various criterion such as whether the client device 102 is connected to the wireless network 106, whether the endpoint 118 is connected to the wireless network 106, whether the client device 102 and/or the endpoint 118 are subscribers to the communication service 120, and so forth.

Alternatively to handing over a call to the communication service 120, the MM module 114 can send a notification of the call to the communication service 120 while call control is maintained by the cellular network 104. If the communication service 120 determines the call is to be handled by the communication service 120, the MM module 114 then hands over the call to the communication service 120. Otherwise, if the communication service 120 determines the call is to be handled by the cellular network 104, the MM module 114 maintains control of the call with the cellular network 104 without handing over the call to the communication service 120.

The wireless network 106 can be implemented in various ways, and is generally representative of a network that provides the client device 102 with connectivity to various networks and/or services, such as the Internet. According to various implementations, the wireless network 106 represents a single integrated network and/or a combination of different interconnected networks. The wireless network 106 may be provided and/or managed by a particular enterprise entity, such as a business entity, an educational institution (e.g., a university), a government institution, and so forth. As used herein, the term "enterprise" generally refers to an entity or group of entities that may maintain a wireless data network for various purposes. The wireless network 106 may provide the client device 102 with wireless connectivity via a variety of different connectivity technologies, such as broadband cable, digital subscriber line (DSL), wireless data connectivity (e.g., WiFi™), T-carrier (e.g., T1), Ethernet, and so forth.

In at least some implementations, communication between the client device 102 and the endpoint 118 is facilitated via a communication client 126a of the client device 102 and a communication client 126b of the endpoint 118. Generally, the communication clients 126a, 126b are representative of functionalities to enable different forms of communication via the client device 102 and the endpoint 118. The communication clients 126a, 126b, for instance, represent interfaces to the communication service 120. Examples of the communication clients 126a, 126b include a voice communication application (e.g., a VoIP client), a video communication application, a messaging application, a content sharing application, and combinations thereof. According to various implementations, the communication clients 126a, 126b enable different communication modalities to be combined to provide diverse communication scenarios.

Having described an example environment in which the techniques described herein may operate, consider now a discussion of example implementation scenarios for routing calls in accordance with one or more embodiments.

Example Implementation Scenarios

The following section describes example implementation scenarios for call handling between a cellular network and a communication service in accordance with one or more embodiments. The implementation scenarios may be implemented in the environment 100 discussed above, the system 1000 described below, and/or any other suitable environment.

Figure 2:
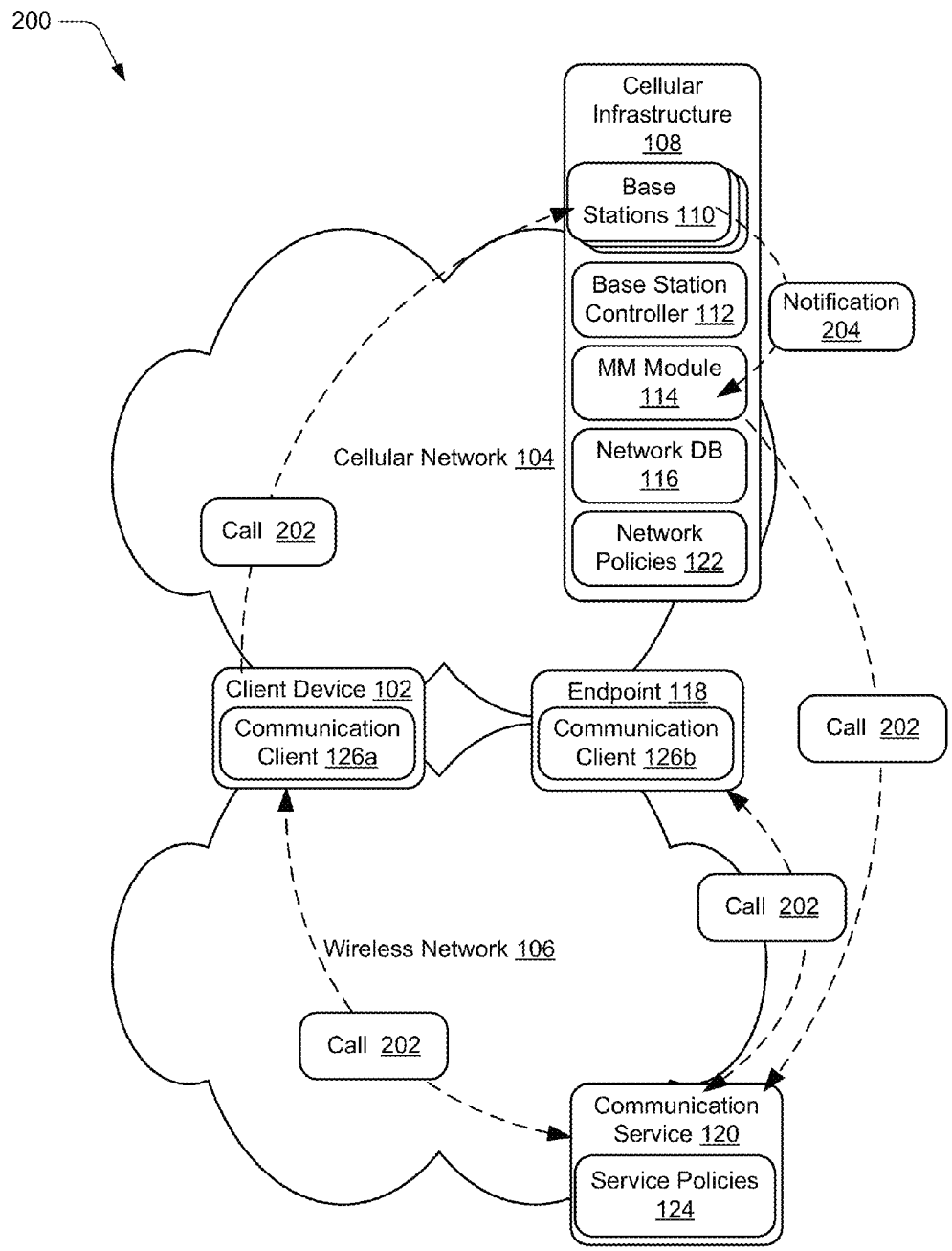
FIG. 2 depicts an example implementation scenario for call handling by a communication service in accordance with one or more embodiments.

FIG. 2 depicts an example implementation scenario for call handling by a communication service generally at 200. The scenario 200 includes various entities and components introduced above with reference to the environment 100.

In the scenario 200, a call 202 is initiated from the client device 102 to the endpoint 118. For example, the user selects an indicia indicating a request to initiate an audio call, such as by entering a phone number for the endpoint 118, selecting a contact from a contact list, selecting a hyperlink, making a voice command, and so on.

As part of initiating the call 202, the client device 102 communicates (e.g., transmits and receives) data with a base station 110 as part of the call 202. Generally, the base station 110 represents an instance of the base stations 110 introduced above.

According to various implementations, the MM module 114 detects that the call 202 is initiated and determines whether the client device 102 is associated with an account with the communication service 120. For instance, a base station controller 112 for the base station 110 communicates a notification 204 to the MM module 114 identifying the client device 102 and/or a user of the client device 102. The MM module 114 then determines whether the client device 102 has a subscription with the communication service 120. Generally, the MM module 114 may make this determination during any stage of the call process, such as during call initiation, after call data is flowing across the cellular network 104 between the client device 102 and the endpoint 118, and so forth. In one particular example, the MM module 114 queries the network DB 116 to determine whether a phone number associated with the call 202 (e.g., for the client device 102 and/or the endpoint 118) is linked to a subscription to the communication service 120. Alternately or additionally, the call 202 may contain a flag indicating a subscription status of the client device 102. The flag, for instance, may indicate that a caller involved in the call has a subscription with the communication service 120. The flag may optionally indicate a subscription level, such as standard service level, premium service level, and so forth. These are non-limiting examples of how the MM module 114 may determine whether the client device 102 is connected with a subscription to the communication service 120, and various other indicia and/or procedures may be employed.

Continuing with the scenario 200, the MM module 114 determines that the client device 102 is linked to a subscription to the communication service 120, and the MM module 114 causes control of the call 202 to be passed (e.g., handed over) to the communication service 120. The MM module 114, for instance, notifies the base station 110 to reroute the call 202 to the communication service 120. Thus, a media flow of the call 202 is rerouted to the communication service 120, such as by rerouting the call 202 from the cellular network 104 over the wireless network 106 to the communication service 120.

The communication service 120 applies a particular service policy 124 to the call 202 to determine whether the call 202 is to be handled through the communication service 120 or by the cellular network 104. For instance, a service policy 124 may specify that if the client device 102 is connected to an alternate wireless network (i.e., other than the cellular network 104), the call 202 is to be routed over the alternate wireless network and managed by the communication service 120. Further, a service policy 124 may require that an alternate wireless network meet certain criteria in order for the call 202 to be routed over the network. Examples of such criteria include that the wireless network meets a certain signal quality threshold, that the network is specific to a particular known entity (e.g., an enterprise, a governmental entity, an educational institution, and so forth), that the network meets a certain minimum security threshold, and so forth.

Additionally or alternatively to network-based considerations, the service policies 124 may consider other criteria, such as resources available on the client device 102 and/or the endpoint 118, user cost considerations for utilizing the cellular network 104, contractual obligations between the communication service 120 and a carrier that deploys the cellular network 104, and so forth.

In the scenario 200, application of a particular service policy 124 to attributes of the call 202 indicates that the call 202 is to be handled by the communication service 120. Accordingly, the communication service 120 maintains control of the call 202 between the client device 102 and the endpoint 118.

In an alternative implementation, instead of immediately handing over the call 202 to the communication service 120 when a determination is made that the client device 102 is associated with the communication service 120, the MM module 114 sends a notification of the call 202 to the communication service 120 without handing over control of the call 202 to the communication service 120. For instance, the MM module 114 notifies the communication service 120 of the call 202 while maintaining control of the call 202 at the cellular network 104. If the communication service 120 determines that the call is to be handled by the communication service 120, the communication service 120 notifies the MM module 114 to hand over the call. Thus, the call is then handed over from the cellular network 104 to the communication service 120. Otherwise, if the communication service 120 determines that the call is to be handled by the cellular network, the communication service 120 notifies the MM module 114 to maintain the call 202 over the cellular network 104. Thus, if the call 202 is to be handled by the cellular network 104, call control can be maintained at the cellular network 104 without handing over the call 202 between the cellular network 104 and the communication service 120.

Figure 3:
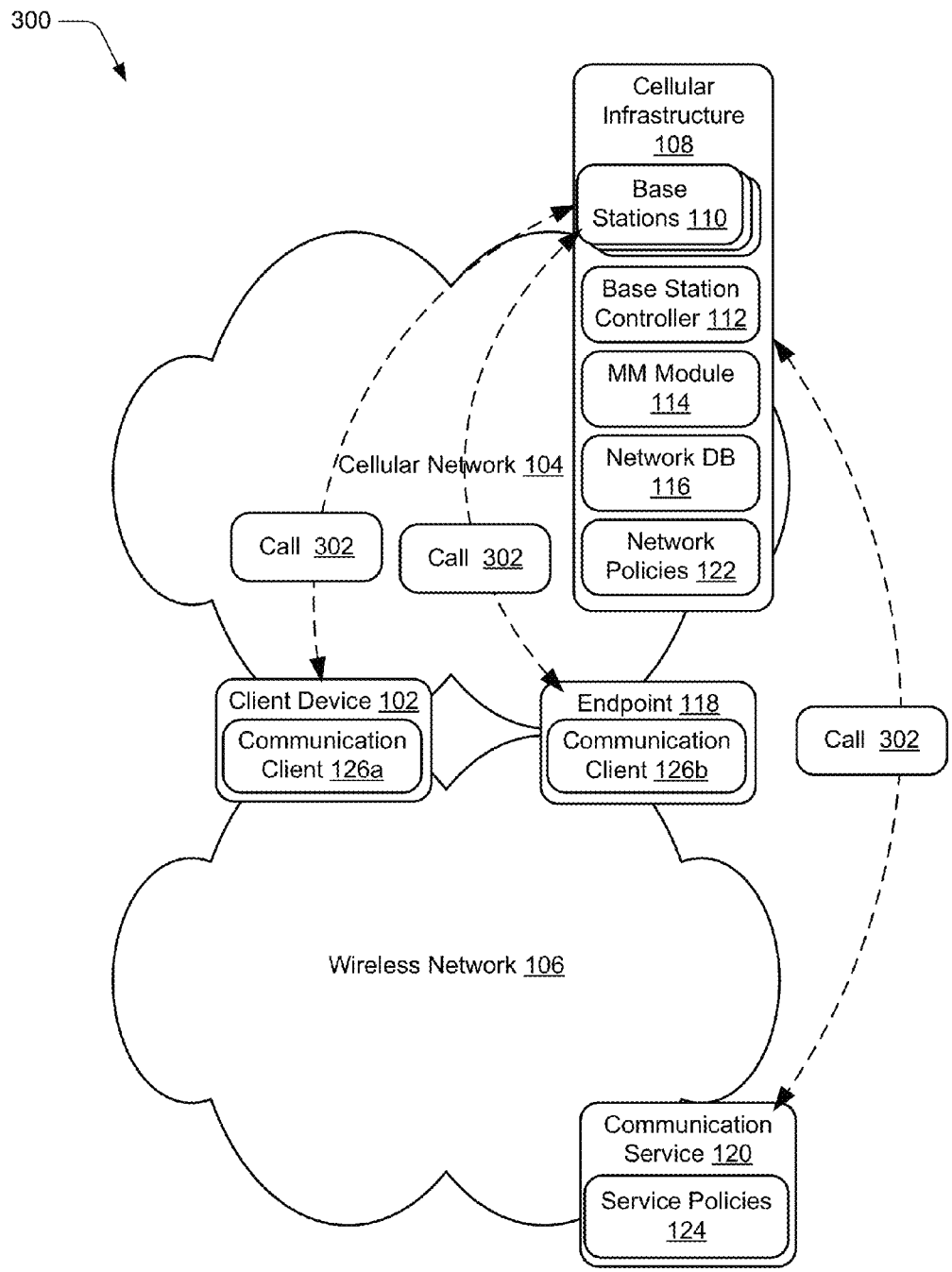
FIG. 3 depicts an example implementation scenario for call handling at a wireless cellular network in accordance with one or more embodiments.

FIG. 3 depicts an example implementation scenario for call handling at a wireless cellular network generally at 300. The scenario 300 includes various entities and components introduced above with reference to the environment 100.

In the scenario 300, the user of the client device initiates a call 302 via the base station 110 in a manner similar to that discussed above in the scenario 200. The MM module 114 detects the call 302, determines that the client device 102 is subscribed to the communication service 120, and hands over control of the call 302 to the communication service 120.

The communication service 120 determines by applying a particular service policy 124 that the call 302 is to be handled by the cellular network 104. Accordingly, the communication service 120 then passes control of the call 302 back to the cellular infrastructure 108 to complete the call 302.

Generally, the particular service policy 124 can consider various attributes and state conditions of the call 302 in determining that the call 302 is to be handled by the cellular network 104. For instance, the communication service 120 determines that the client device 102 is not connected to a suitable alternative wireless network, e.g., the wireless network 106. Thus, the service policy 124 indicates that the call 302 is to be handled by the cellular network 104.

According to various implementations, determining that the client device 102 is not connected to a suitable alternative wireless network indicates either that the client device 102 is not connected to an alternative wireless network, or that the client device 102 is connected to an alternative wireless network that does not meet certain suitability criteria. For instance, the communication service policies 124 can specify that if the client device 102 is connected to an alternative wireless network (e.g., the wireless network 106) that does not meet certain signal strength and/or signal quality criteria, the call 302 is to be handled by the cellular network 104.

In another example implementation, the communication service policies 124 can specify that if the endpoint 118 is connected to a different cellular network with which the communication service 120 has an agreement to prioritize voice traffic, the communication service 120 is to pass control of the call 302 to the different cellular network.

Figure 4:
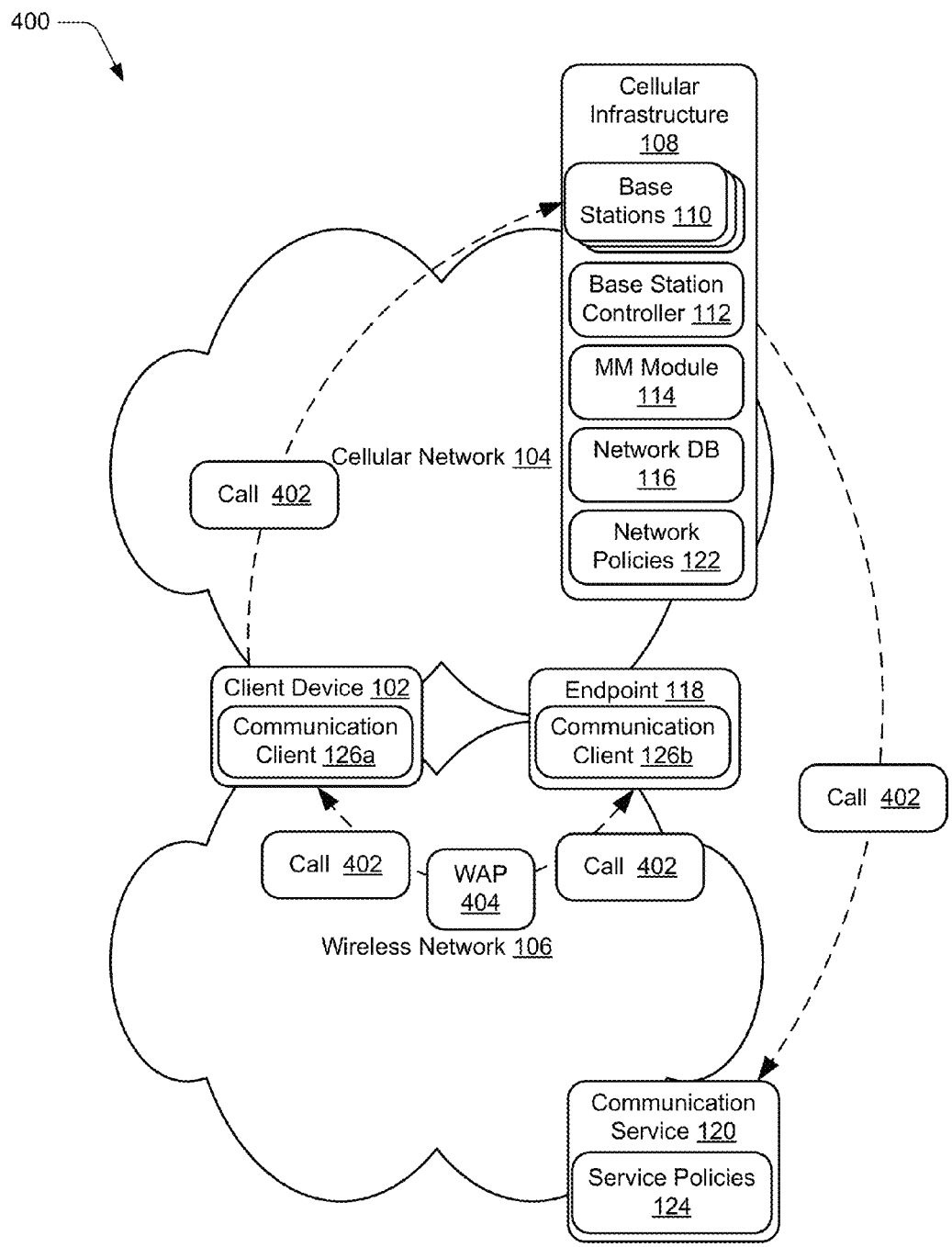
FIG. 4 depicts an example implementation scenario for routing a call over a common wireless network in accordance with one or more embodiments.

FIG. 4 depicts an example implementation scenario for routing a call over a common wireless network generally at 400. The scenario 400 includes various entities and components introduced above with reference to the environment 100.

In the scenario 400, the user of the client device initiates a call 402 via the base station 110 in a manner similar to that discussed above in the scenario 200. The MM module 114 detects the call 402, determines that the client device 102 is subscribed to the communication service 120, and hands over control of the call 402 to the communication service 120.

The communication service 120 determines that the client device 102 and endpoint 118 are both connected to a same wireless network 106. As described above, the wireless network 106 can be implemented in any suitable way. In this particular example, the wireless network 106 is implemented as a wireless local access network (WLAN), such as implemented by an enterprise entity. Accordingly, the communication service 120 applies a service policy 124 that indicates that the call 402 is to be routed between the client device 102 and the endpoint 118 over the wireless network 106.

Thus, the communication service 120 brokers handling of the call by the local wireless network 106. For instance, the communication service 120 interfaces with a wireless access point (WAP) 404 of the wireless network 106 to cause a wireless connection to be established between the client device 102 and the endpoint 118 and via the WAP 404. Thus, the call 402 is routed between the client device 102 and the endpoint 118 via connectivity to the WAP 404.

Accordingly, the scenarios described above illustrate that techniques for call handling between a cellular network and a communication service described herein enable routing and rerouting of communication sessions between different networks and based on changing network and connectivity scenarios. In at least some implementations, aspects of the scenarios may be applied dynamically (e.g., in real time) to accommodate changing network and connectivity scenarios. For instance, a call can be transferred between a wireless cellular network and a communication service multiple times in real time and in response to a change in one or more call conditions for the call, such as a change in network connectivity, and change in network quality, and so forth. These example scenarios are presented for purpose of example only, and it is to be appreciated that techniques described herein may be employed in a variety of scenarios not expressly described herein.

Having discussed some example implementation scenarios, consider now a discussion of some example procedures in accordance with one or more embodiments.

Example Procedures

The following discussion describes some example procedures for call handling between a cellular network and a communication service in accordance with one or more embodiments. The example procedures may be employed in the environment 100 of FIG. 1, the system 1000 of FIG. 10, and/or any other suitable environment. Further, the example procedures may represent implementations of the example scenarios discussed above. In at least some embodiments, steps described for the various procedures can be implemented automatically and independent of user interaction.

Figure 5:
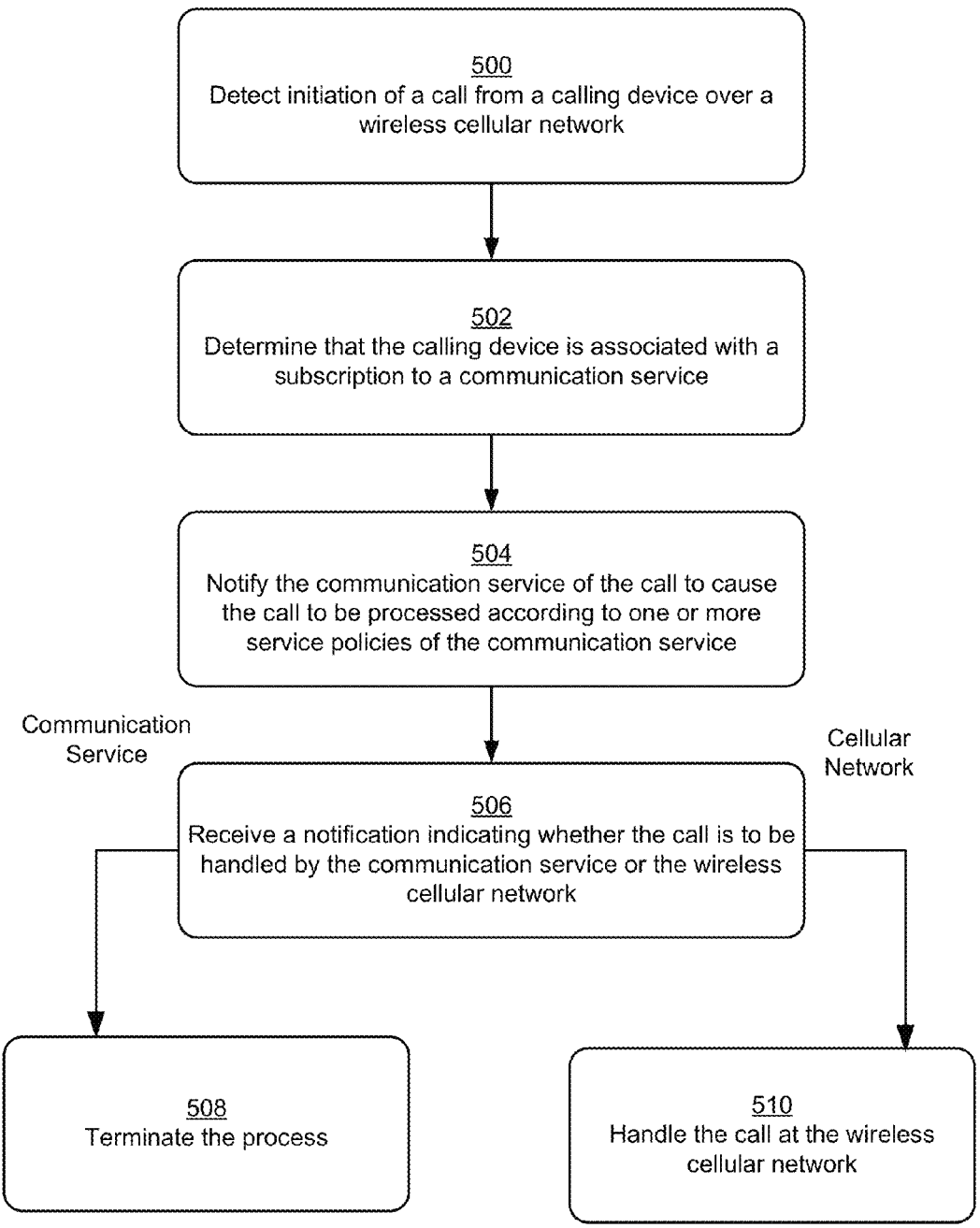
FIG. 5 is a flow diagram that describes steps in a method for handling a call initiated on a cellular network in accordance with one or more embodiments.

FIG. 5 is a flow diagram that describes steps in a method in accordance with one or more embodiments. The method, for instance, describes an example procedure for handling a call (e.g., an audio call) initiated on a cellular network. In at least some implementations, the method can be performed at least in part by the MM module 114.

Step 500 detects initiation of a call from a calling device over a wireless cellular network. The call is detected, for instance, at an infrastructure component of the wireless cellular network, such as a base station 110, the MM module 114, and so forth.

Step 502 determines that the calling device is associated with a subscription to a communication service. The MM module 114, for instance, queries the network DB 116 with information pertaining to the call, such as a phone number of the client device 102, a user name associated with the client device 102, one or more device identifiers of the client device 102, and so forth. The query returns a response indicating that the client device 102 is associated with a subscription (e.g., an account) with the communication service 120.

Step 504 notifies the communication service of the call to cause the call to be processed according to one or more service policies of the communication service. The MM module 114, for instance, communicates a notification to the communication service 120 that includes data identifying various attributes of the call, such as user and/or device identifiers, network identifiers for one or more networks to which the calling device is connected, a phone number of the calling device, and so forth. In at least some implementations, the MM module 114 notifies the communication service 120 of the call by routing call control data and/or call media data of the call to the communication service. Alternatively, the MM module 114 communicates the notification while call control and/or media flow for the call is maintained at the cellular network 104.

Step 506 receives a notification indicating whether the call is to be handled by the communication service or the wireless cellular network. The MM module 114, for instance, receives a notification from the communication service 120 indicating whether the call is to be handled by the communication service 120 or the cellular network 104.

If the notification indicates that the call is to be handled by the communication service ("communication service"), step 508 terminates the process. The MM module 114, for instance, hands control of the call and/or routing of a media flow of the call over to the communication service 120. If the notification indicates that the call is to be handled by the wireless cellular network ("cellular network"), step 510 handles the call at the wireless cellular network. For instance, consider the following example procedure.

Figure 6:
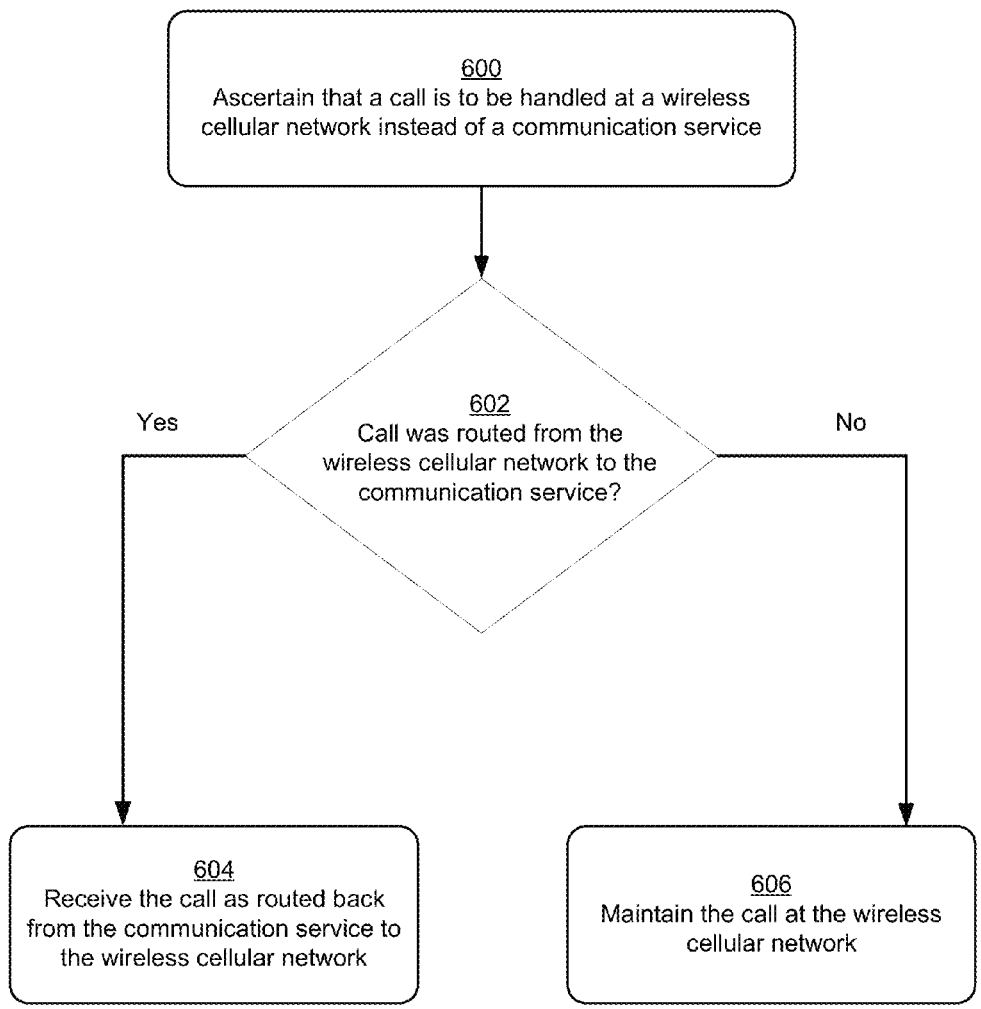
FIG. 6 is a flow diagram that describes steps in a method for handling a call at a cellular network in accordance with one or more embodiments.

FIG. 6 is a flow diagram that describes steps in a method in accordance with one or more embodiments. The method, for instance, describes an example procedure for handling a call (e.g., an audio call) at a cellular network. In at least some implementations, the method can be performed at least in part by the MM module 114. The method, for instance, represents an example implementation of step 510 described above.

Step 600 ascertains that a call is to be handled at a wireless cellular network instead of a communication service. The MM module 114, for instance, ascertains that a call initiated over the cellular network 104 and associated with a subscriber of the communication service 120 is to be handled at the cellular network 104. For example, the communication service 120 communicates a notification to the MM module 114 indicating that the call is to be handled by the cellular network 104. Example ways of determining whether a call is to be handled at a cellular network or at a communication service are detailed throughout this discussion.

Step 602 ascertains whether the call was routed from the wireless cellular network to the communication service. The MM module 114, for instance, ascertains whether call control and/or a media flow of the call was routed from the cellular network 104 to the communication service 120.

If the call was routed from the wireless cellular network to the communication service ("Yes"), step 604 receives the call as routed back from the communication service to the wireless cellular network. For example, the communication service 120 reroutes the call back to the cellular network 104.

If the call was not routed from the wireless cellular network to the communication service ("No"), step 606 maintains the call at the wireless cellular network. The MM module 114, for example, maintains call control and/or a media flow of the call over the cellular network 104.

Figure 7:
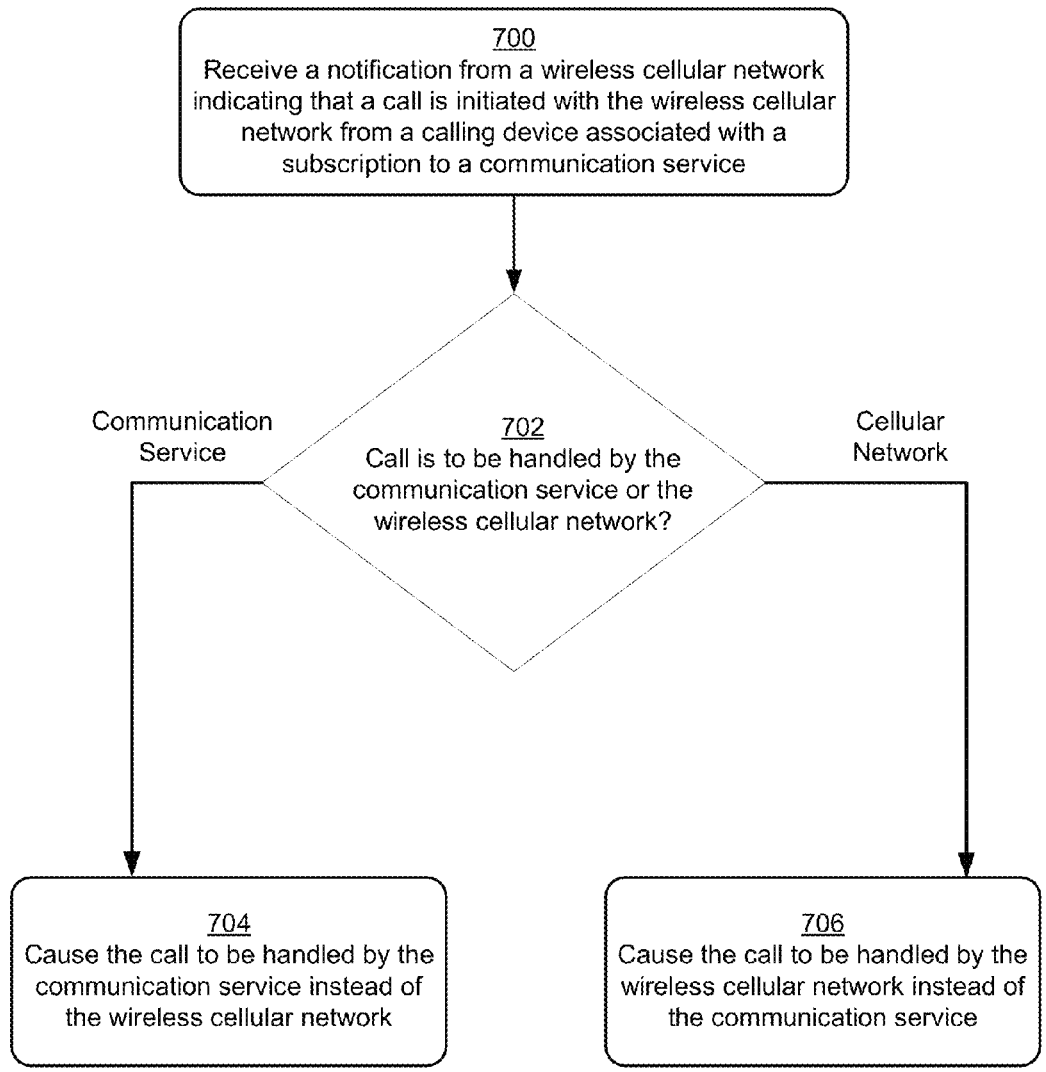
FIG. 7 is a flow diagram that describes steps in a method for handling a call in accordance with one or more embodiments.

FIG. 7 is a flow diagram that describes steps in a method in accordance with one or more embodiments. The method, for instance, describes an example procedure for handling a call, such as an audio call. In at least some implementations, the method can be performed at least in part by the communication service 120.

Step 700 receives a notification from a wireless cellular network indicating that a call is initiated with the wireless cellular network from a calling device associated with a subscription to a communication service. The communication service 120, for instance, receives a notification from the cellular network 104 (e.g., the MM module 114) indicating that a call is initiated over the cellular network 104 by a device with a subscription to the communication service 120.

Generally, the notification may take various forms. For instance, the notification may include data identifying various attributes of the call. Alternatively or additionally, the notification may include a hand over of call control and/or media flow of the call from the wireless cellular network to the communication service.

Step 702 determines whether the call is to be handled by the communication service or the wireless cellular network. The communication service 120, for instance, applies one or more attributes of the call to the service policies 124 to determine whether the call is to be handled by the communication service 120 or the cellular network 104.

If the call is to be handled by the communication service ("Communication Service"). step 704 causes the call to be handled by the communication service instead of the wireless cellular network. The communication service 120, for instance, applies one or more attributes of the call to the service policies 124 to determine that the call is to be handled by the communication service 120. Examples of different call-related attributes are discussed above, such as whether the client device 102 is connected to a suitable alternative wireless network, whether the client device 102 and the endpoint 118 are connected to a same alternative wireless network, and so forth.

In at least some implementations, the communication service 120 can manage call control while utilizing a data connection of the cellular network to route a media flow of the call.

If the call is to be handled by the wireless cellular network ("Cellular Network"), step 706 causes the call to be handled by the wireless cellular network instead of the communication service. The communication service 120, for instance, applies one or more attributes of the call to the service policies 124 to determine that the call is to be handled by the cellular network 104. For example, the communication service 120 determines that the client device 102 is not connected to a suitable alternative wireless network 106, and thus the call is to be handled by the cellular network 104. As another example, the communication service 120 determines that it has a contractual obligation to route calls over the cellular network 104, and thus the communication service 120 delegates call handling to the cellular network 104.

Figure 8:
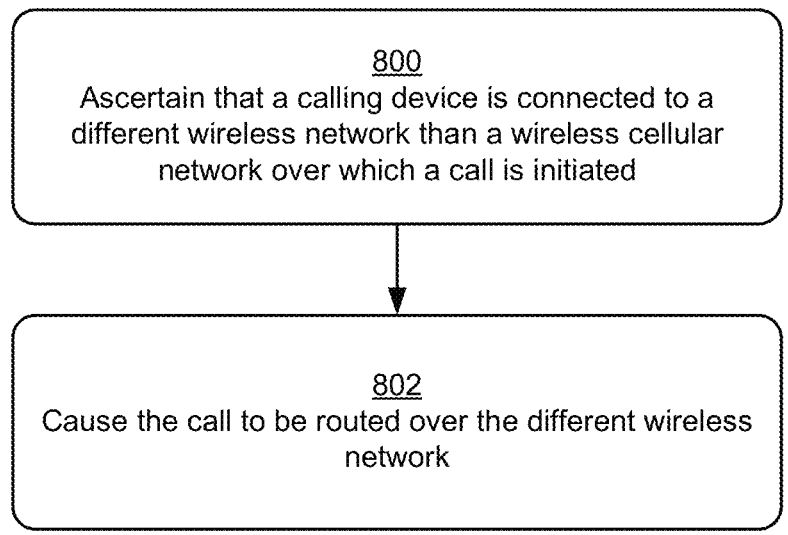
FIG. 8 is a flow diagram that describes steps in a method for handling a call at a communication service in accordance with one or more embodiments.

FIG. 8 is a flow diagram that describes steps in a method in accordance with one or more embodiments. The method, for instance, describes an example procedure for handling a call (e.g., an audio call) at a communication service. In at least some implementations, the method can be performed at least in part by the communication service 120. The method, for instance, represents an example implementation of step 704 described above.

Step 800 ascertains that a calling device is connected to a different wireless network than a wireless cellular network over which a call is initiated. The communication service 120, for instance, ascertains that the client device 102 is connected to the wireless network 106, and that the wireless network 106 is preferred over the cellular network 104 for call routing. For example, a particular service policy 124 indicates that the wireless network 106 is a preferred network.

Step 802 causes the call to be routed over the different wireless network. The communication service 120, for instance, routes a media flow of the call over the wireless network 106, or instructs the cellular network 104 to reroute the media flow over the wireless network 106.

Figure 9:
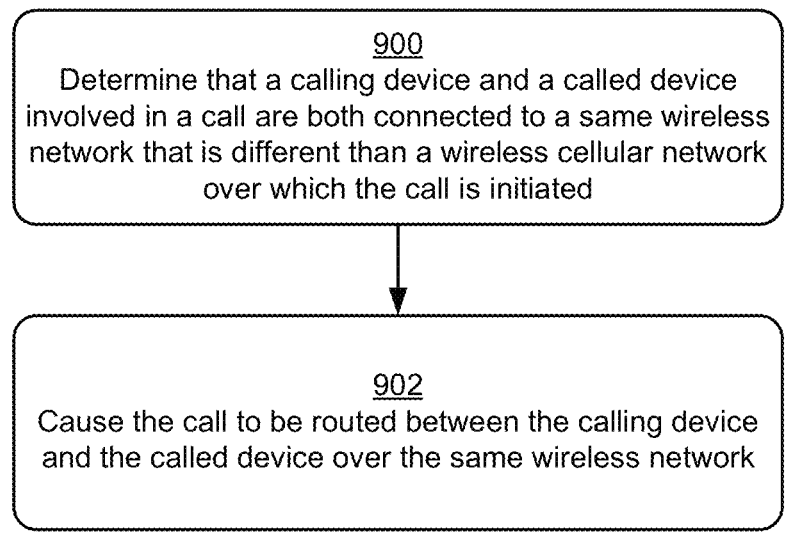
FIG. 9 is a flow diagram that describes steps in a method for handling a call at a communication service in accordance with one or more embodiments.

FIG. 9 is a flow diagram that describes steps in a method in accordance with one or more embodiments. The method, for instance, describes an example procedure for handling a call (e.g., an audio call) at a communication service. In at least some implementations, the method can be performed at least in part by the communication service 120. The method, for instance, represents an example implementation of step 704 described above.

Step 900 determines that a calling device and a called device involved in a call are both connected to a same wireless network that is different than a wireless cellular network over which the call is initiated. The communication service 120, for instance, ascertains that the client device 102 and the endpoint 118 are both connected to the wireless network 106.

Step 902 causes the call to be routed between the calling device and the called device over the same wireless network. The communication service 120, for instance, causes a media flow of the call to be routed between the client device 102 and the endpoint 118 over the wireless network 106, and/or instructs the cellular network 104 to reroute the media flow over the wireless network 106.

Having discussed some example procedures, consider now a discussion of an example system and device in accordance with one or more embodiments.

Example System and Device

Figure 10:
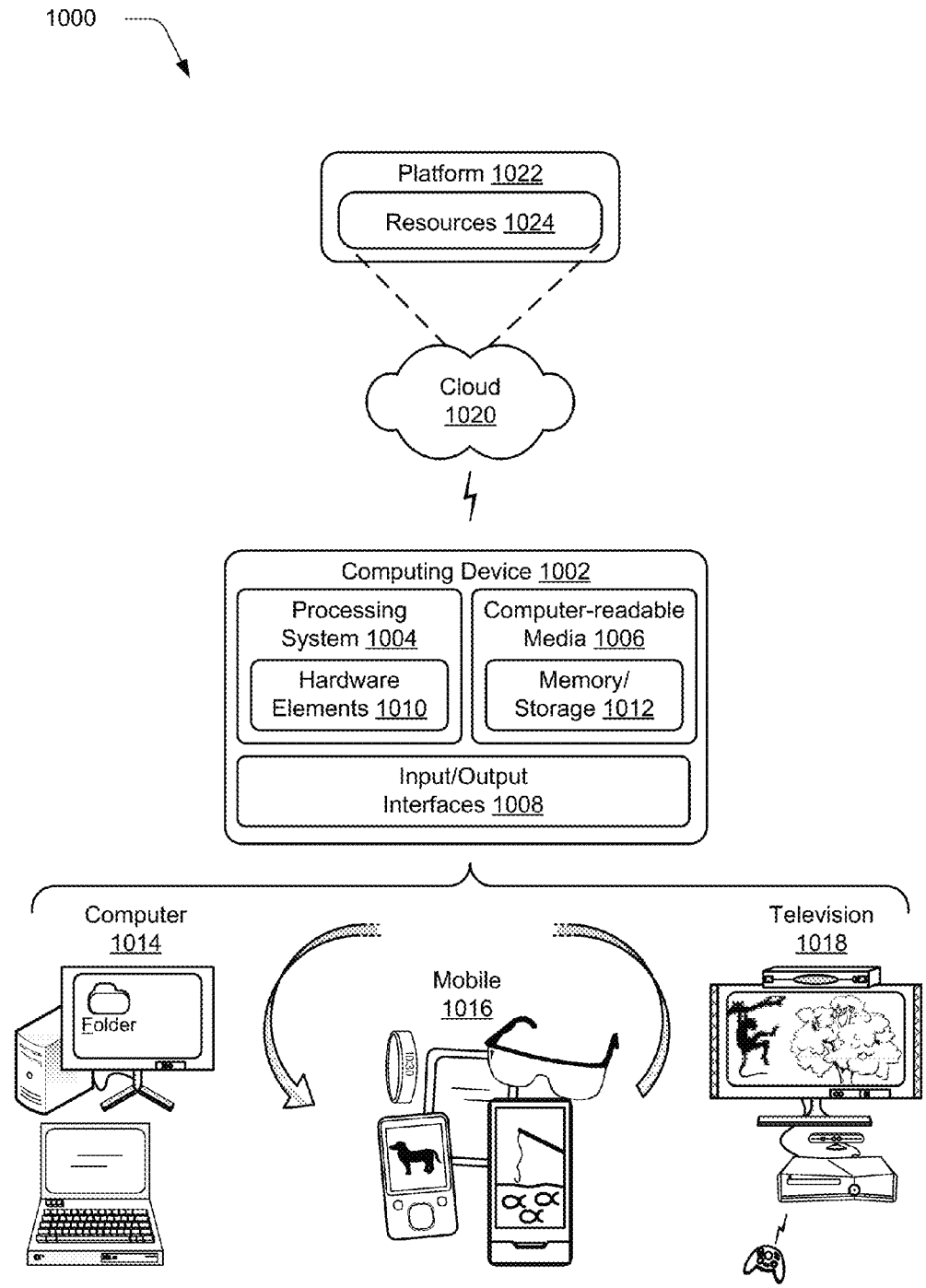
FIG. 10 illustrates an example system and computing device as described with reference to FIG. 1, which are configured to implement embodiments of techniques described herein.

FIG. 10 illustrates an example system generally at 1000 that includes an example computing device 1002 that is representative of one or more computing systems and/or devices that may implement various techniques described herein. For example, various entities and/or components discussed above with reference to FIG. 1 can be embodied as the computing device 1002. The computing device 1002 may be, for example, a server of a service provider, a device associated with the client (e.g., a client device), an on-chip system, and/or any other suitable computing device or computing system.

The example computing device 1002 as illustrated includes a processing system 1004, one or more computer-readable media 1006, and one or more Input/Output (I/O) Interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1010 and computer-readable media 1006 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of modules that are executable by the computing device 1002 as software may be achieved at least partially in hardware, e.g., through use of computer-readable storage media and/or hardware elements 1010 of the processing system. The instructions and/or functions may be executable/operable by one or more articles of manufacture (for example, one or more computing devices 1002 and/or processing systems 1004) to implement techniques, modules, and examples described herein.

As further illustrated in FIG. 10, the example system 1000 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1000, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1002 may assume a variety of different configurations, such as for computer 1014, mobile 1016, and television 1018 uses. Each of these configurations includes devices that may have generally different constructs and capabilities, and thus the computing device 1002 may be configured according to one or more of the different device classes. For instance, the computing device 1002 may be implemented as the computer 1014 class of a device that includes a personal computer, desktop computer, a multi-screen computer, laptop computer, netbook, and so on.

The computing device 1002 may also be implemented as the mobile 1016 class of device that includes mobile devices, such as a mobile phone, portable music player, portable gaming device, a tablet computer, a wearable device, a multi-screen computer, and so on. The computing device 1002 may also be implemented as the television 1018 class of device that includes devices having or connected to generally larger screens in casual viewing environments. These devices include televisions, set-top boxes, gaming consoles, and so on.

The techniques described herein may be supported by these various configurations of the computing device 1002 and are not limited to the specific examples of the techniques described herein. For example, functionalities discussed with reference to the cellular infrastructure 108 and/or the communication service 120 may be implemented all or in part through use of a distributed system, such as over a "cloud" 1020 via a platform 1022 as described below.

The cloud 1020 includes and/or is representative of a platform 1022 for resources 1024. The platform 1022 abstracts underlying functionality of hardware (e.g., servers) and software resources of the cloud 1020. The resources 1024 may include applications and/or data that can be utilized while computer processing is executed on servers that are remote from the computing device 1002. Resources 1024 can also include services provided over the Internet and/or through a subscriber network, such as a cellular or Wi-Fi network.

The platform 1022 may abstract resources and functions to connect the computing device 1002 with other computing devices. The platform 1022 may also serve to abstract scaling of resources to provide a corresponding level of scale to encountered demand for the resources 1024 that are implemented via the platform 1022. Accordingly, in an interconnected device embodiment, implementation of functionality described herein may be distributed throughout the system 1000. For example, the functionality may be implemented in part on the computing device 1002 as well as via the platform 1022 that abstracts the functionality of the cloud 1020.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Implementations discussed herein include:

EXAMPLE 1

A system for handling a call initiated over a wireless cellular network, the system including: at least one processor; and one or more computer-readable storage media including instructions stored thereon that, responsive to execution by the at least one processor, cause the system perform operations including: detecting, at an infrastructure component of a wireless cellular network, initiation of a call from a calling device over the wireless cellular network; determining that the calling device is associated with a subscription to a communication service that is separate from the wireless cellular network; and notifying the communication service of the call to cause the call to be processed according to one or more service policies of the communication service.

EXAMPLE 2

A system as described in example 1, wherein the infrastructure component includes a wireless base station of the wireless cellular network.

EXAMPLE 3

A system as described in one or more of examples 1 or 2, wherein said determining includes determining that a phone number of the calling device is linked to the subscription to the communication service.

EXAMPLE 4

A system as described in one or more of examples 1-3, wherein said determining includes determining that a user of the calling device is linked to the subscription to the communication service.

EXAMPLE 5

A system as described in one or more of examples 1-4, wherein the communication service includes a service that implemented independent of the wireless cellular network.

EXAMPLE 6

A system as described in one or more of examples 1-5, wherein the communication service includes a Voice over Internet Protocol (VoIP) network.

EXAMPLE 7

A system as described in one or more of examples 1-6, wherein said notifying includes routing call control of the call to the communication service.

EXAMPLE 8

A system as described in one or more of examples 1-7, wherein said notifying includes routing a media flow of the call to the communication service.

EXAMPLE 9

A system as described in one or more of examples 1-8, wherein said notifying includes routing a media flow of the call over a wireless network that is different than the wireless cellular network.

EXAMPLE 10

A system as described in one or more of examples 1-9, wherein the operations further include: receiving a notification from the communication service that the call is to be handled by the wireless cellular network; and handling the call by the wireless cellular network.

EXAMPLE 11

A system as described in one or more of examples 1-10, wherein said notifying includes routing a media flow of the call to the communication service, wherein the operations further include: receiving a notification from the communication service that the call is to be handled by the wireless cellular network; and receiving the call as routed back from the communication service to the wireless cellular network; and handling the call over the wireless cellular network.

EXAMPLE 12

A system as described in one or more of examples 1-11, wherein the call is transferred between the wireless cellular network and the communication service multiple times in real time and in response to a change in one or more call conditions for the call.

EXAMPLE 13

A method for handling a call initiated over a wireless cellular network, the method including: receiving a notification from a wireless cellular network indicating that a call is initiated with the wireless cellular network from a calling device associated with a subscription to a communication service; determining that the call is to be handled by the communication service; and causing the call to be handled by the communication service instead of the wireless cellular network.

EXAMPLE 14

A method as described in example 13, wherein said receiving includes receiving a hand over of the call from the wireless cellular network to the communication service.

EXAMPLE 15

A method as described in one or more of examples 13 or 14, wherein said receiving includes receiving the notification at the communication service without a hand over of the call from the wireless cellular network to the communication service.

EXAMPLE 16

A method as described in one or more of examples 13-15, wherein said causing includes causing the call to be managed by the communication service and a media flow of the call to be routed via a data connection over the wireless cellular network.

EXAMPLE 17

A method as described in one or more of examples 13-16, further including ascertaining that the calling device is connected to a different wireless network than the wireless cellular network, wherein said determining includes determining that the different wireless network is preferred to the wireless cellular network for the call, and said causing includes causing the call to be routed over the different wireless network.

EXAMPLE 18

A method as described in one or more of examples 13-17, wherein said determining includes determining that the calling device and a called device are both connected to a same wireless network that is different than the wireless cellular network, and wherein said causing includes causing the call to be routed between the calling device and the called device over the same wireless network.

EXAMPLE 19

A method for handling a call initiated over a wireless cellular network, the method including: receiving at a communication service a notification from a wireless cellular network indicating that a call is initiated with the wireless cellular network from a calling device associated with a subscription to a communication service; determining that the call is to be handled by the wireless cellular network instead of communication service; and causing the call to be handled by the wireless cellular network instead of the communication service.

EXAMPLE 20

A method as described in example 19, wherein said determining includes determining that the calling device is not connected to a suitable alternative wireless network.

CONCLUSION

Techniques for call handling between a cellular network and a communication service calling are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:
1. A system comprising:
at least one processor; and
one or more computer-readable storage media including instructions stored thereon that, responsive to execution by the at least one processor, cause the system perform operations including:
detecting initiation of a call from a calling device over a wireless cellular network;
determining that the calling device is associated with an account with a communication service that is separate from the wireless cellular network;
notifying the communication service of the call to cause call control to be passed to the communication service;
receiving a notification from the communication service that the call is to be handled by the wireless cellular network;
receiving the call as routed back from the communication service to the wireless cellular network; and
handling the call over the wireless cellular network.
2. The system as recited in claim 1, wherein said detecting is performed by an infrastructure component of the wireless cellular network.
3. The system as recited in claim 1, wherein said determining comprises determining that a phone number of the calling device is linked to the account with the communication service.
4. The system as recited in claim 1, wherein said determining comprises determining that a user of the calling device is linked to the account with the communication service.

5. The system as recited in claim 1, wherein the communication service comprises a service that implemented independent of the wireless cellular network.

6. The system as recited in claim 1, wherein the communication service comprises a Voice over Internet Protocol (VoIP) network.

7. The system as recited in claim 1, wherein said notifying comprises routing a media flow of the call to the communication service.

8. The system as recited in claim 1, wherein said notifying comprises routing a media flow of the call over a wireless network that is different than the wireless cellular network.

9. The system as recited in claim 1, wherein the call is transferred between the wireless cellular network and the communication service multiple times in real time and in response to a change in one or more call conditions for the call.

10. A method comprising:
receiving a notification from a wireless cellular network indicating that a call is initiated with the wireless cellular network from a calling device associated with an account with a communication service that is separate from the wireless cellular network;
receiving call control from the wireless cellular network at the communication service;
determining that the call is to be handled by the wireless cellular network;
routing the call back from the communication service to the wireless cellular network; and
causing the call to be handled by the wireless cellular network.

11. The method as recited in claim 10, wherein the communication service comprises a Voice over Internet Protocol (VoIP) service.

12. The method as recited in claim 10, wherein said determining comprises determining that the calling device is not connected to a suitable alternative wireless network.

13. The method as recited in claim 10, wherein the call is transferred between the wireless cellular network and the communication service multiple times in real time and in response to a change in one or more call conditions for the call.

14. The method as recited in claim 10, further comprising:
receiving an indication that the call is to be handled by the communication service; and
causing a hand over of the call from the wireless cellular network to the communication service.

15. A method comprising:
receiving at a communication service a notification that a call is initiated with a wireless cellular network by a calling device associated with an account with a communication service that is separate from the wireless cellular network;
receiving call control from the wireless cellular network at the communication service;
determining that the call is to be handled by the wireless cellular network;
routing the call back from the communication service to the wireless cellular network;
determining that the call is to be handled by the communication service; and
receiving the call back from the wireless cellular network at the communication service.

16. The method as recited in claim 15, wherein said receiving call control comprises receiving a hand over of the call from the wireless cellular network to the communication service.

17. The method as recited in claim 15, wherein said receiving the notification comprises receiving the notification at the communication service separate from a hand over of the call from the wireless cellular network to the communication service.

18. The method as recited in claim 15, further comprising causing the call to be managed by the communication service and a media flow of the call to be routed via a data connection over the wireless cellular network.

19. The method as recited in claim 15, wherein the communication service comprises a Voice over Internet Protocol (VoIP) service.

20. The method as recited in claim 15, wherein said determining that the call is to be handled by the communication service is based on a change in network quality at the wireless cellular network.

21. A method comprising:
detecting initiation of a call from a calling device over a wireless cellular network;
determining that the calling device is associated with an account with a communication service that is separate from the wireless cellular network;
notifying the communication service of the call to cause call control to be passed to the communication service;
receiving a notification from the communication service that the call is to be handled by the wireless cellular network;
receiving the call as routed back from the communication service to the wireless cellular network; and
handling the call over the wireless cellular network.

22. The method as recited in claim 21, wherein said determining comprises determining that a phone number of the calling device is linked to the account with the communication service.

23. The method as recited in claim 21, wherein said determining comprises determining that a user of the calling device is linked to the account with the communication service.

24. The method as recited in claim 21, wherein the communication service comprises a service that is implemented independent of the wireless cellular network.

25. The method as recited in claim 21, wherein the communication service comprises a Voice over Internet Protocol (VoIP) network.

26. The method as recited in claim 21, wherein the call is transferred between the wireless cellular network and the communication service multiple times in real time and in response to a change in one or more call conditions for the call.

27. A system comprising:
at least one processor; and
one or more computer-readable storage media including instructions stored thereon that, responsive to execution by the at least one processor, cause the system to perform operations including:
receiving a notification indicating that a call is initiated with a wireless cellular network by a calling device associated with an account with a communication service that is separate from the wireless cellular network;
receiving call control from the wireless cellular network at the communication service;
determining that the call is to be handled by the wireless cellular network;
routing the call back from the communication service to the wireless cellular network; and causing the call to be handled by the wireless cellular network.

28. The system as recited in claim 27, wherein said receiving call control comprises receiving a hand over of the call from the wireless cellular network to the communication service.

29. The system as recited in claim 27, wherein the communication service comprises a Voice over Internet Protocol (VoIP) service.

30. The system as recited in claim 27, wherein the call is transferred between the wireless cellular network and the communication service multiple times in real time and in response to a change in one or more call conditions for the call.

* * * * *